(12) United States Patent
Matoba

(10) Patent No.: US 8,654,633 B2
(45) Date of Patent: Feb. 18, 2014

(54) DATA COMMUNICATION APPARATUS, DATA COMMUNICATION METHOD AND DATA COMMUNICATION PROCESSING PROGRAM

(75) Inventor: Kazuo Matoba, Akashi (JP)

(73) Assignee: Konica Minolta Business Technologies, Inc, Chiyoda-Ku, Tokyo (JP)

( * ) Notice: Subject to any disclaimer, the term of this patent is extended or adjusted under 35 U.S.C. 154(b) by 512 days.

(21) Appl. No.: 11/634,079

(22) Filed: Dec. 6, 2006

(65) Prior Publication Data

US 2007/0171821 A1 Jul. 26, 2007

(30) Foreign Application Priority Data

Jan. 25, 2006 (JP) .................. 2006-016272

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ........................................ 370/230

(58) Field of Classification Search
USPC .................. 370/230, 235, 229, 231
See application file for complete search history.

(56) References Cited

U.S. PATENT DOCUMENTS

| | | | |
|---|---|---|---|
| 6,437,871 B1 | 8/2002 | Yuki | |
| 6,437,873 B1 | 8/2002 | Maeda | |
| 6,714,315 B1 | 3/2004 | Yoshida | |
| 6,980,556 B2 | 12/2005 | Vimpari | |
| 2003/0112947 A1* | 6/2003 | Cohen | 379/202.01 |
| 2004/0127242 A1* | 7/2004 | Dashevsky et al. | 455/502 |
| 2004/0165561 A1* | 8/2004 | Chiou et al. | 370/338 |
| 2005/0198169 A1* | 9/2005 | Holten et al. | 709/206 |
| 2006/0002256 A1* | 1/2006 | Kamio | 369/47.1 |
| 2006/0007486 A1* | 1/2006 | Tanimoto | 358/1.15 |
| 2006/0083192 A1* | 4/2006 | Dinescu et al. | 370/328 |
| 2006/0277262 A1* | 12/2006 | Boss et al. | 709/206 |
| 2007/0133435 A1* | 6/2007 | Eneroth et al. | 370/260 |

FOREIGN PATENT DOCUMENTS

| | | |
|---|---|---|
| JP | 2002-333958 | 11/2002 |
| JP | 2004-247837 A | 9/2004 |
| JP | 2005-086580 A | 3/2005 |

(Continued)

OTHER PUBLICATIONS

Notification of Reasons for Refusal in JP 2006-016272 dated Feb. 5, 2008, and translation thereof.

*Primary Examiner* — Huy D Vu
*Assistant Examiner* — Adnan Baig
(74) *Attorney, Agent, or Firm* — Buchanan Ingersoll & Rooney PC

(57) ABSTRACT

A data communication apparatus, comprising: a first control unit for controlling a client trying to access in order to establish a session by a call control protocol, for data communication by a data communication protocol that is other than said call control protocol; an IP address acquiring unit for acquiring an IP address of said client from the data of said call control protocol; and a second control unit for rejecting data communication from a client, which IP address is other than said acquired IP address, while and after said session is established.

20 Claims, 6 Drawing Sheets

(56) References Cited

FOREIGN PATENT DOCUMENTS

| JP | 2005-101745 | | 4/2005 | |
| JP | 2005-159588 A | | 6/2005 | |
| JP | 2005-223693 A | | 8/2005 | |
| JP | 2006-018538 | | 1/2006 | |
| WO | WO2005/039139 | * | 4/2005 | .......... 370/260 |
| WO | WO 2005039139 A1 | * | 4/2005 | |

* cited by examiner

```
INVITE:sip:bob@konicaminolta.jp SIP/2.0
Via:Sip/2.0/UDP pc33.sapporo.com;branch=z9hG4Bknashds8
Max-Forwads:70
To:Bob<sip:device@konicaminolta.jp>
From:Alice<sip:client2@Sapporo.com>;tag=1928301774
Call-ID:4598998103413@pc.sapporo.com
Cseq:1 INVITE
Contact:<sip:client2@pc33.Sapporo.com>
Content-Length: × × × × × v=0
o=- 1 1 IN IP4 192.168.25.51
s=-
c=IN IP4 192.168.25.51
t=0 0
m=data 10001 tcp ftp
...
``` reject

```
INVITE:sip:bob@konicaminolta.jp SIP/2.0
Via:Sip/2.0/UDP pc33.sapporo.com;branch=z9hG4Bknashds8
Max-Forwads:70
To:Bob<sip:device@konicaminolta.jp>
From:Alice<sip:client2@Sapporo.com>;tag=1928301774
Call-ID:4598998103413@pc.sapporo.com
Cseq:1 INVITE
Contact:<sip:client2@pc33.Sapporo.com>
Content-Length: × × × × × v=0
o=- 1 1 IN IP4 192.168.25.51
s=-
c=IN IP4 192.168.25.51,  IN IP4 192.168.2.121
t=0 0
m=data 10001 tcp ftp
...
```

FIG.6

DATA COMMUNICATION APPARATUS, DATA COMMUNICATION METHOD AND DATA COMMUNICATION PROCESSING PROGRAM

This application claims priority under 35 U.S.C. §119 to Japanese Unexamined Patent Application No. 2006-16272 filed on Jan. 25, 2006, and the disclosure is hereby incorporated by reference in its entirety.

BACKGROUND OF THE INVENTION

1. Field of the Invention

The present invention relates to a data communication apparatus, which is applied to e.g. MFP (Multi Function Peripherals), a multi functional digital copying machine, that is able to establishing a session with a client by a call control protocol and performing data communication by a data communication protocol after the session is established, a data communication method, and a data communication processing program stored on a computer readable medium to make a computer for a data communication apparatus execute data communication processing.

2. Description of the Related Art

The following description sets forth the inventor's knowledge of related art and problems therein and should not be construed as an admission of knowledge in the prior art.

For recent years, along with the popularization of Internet, technologies which enable access via the IP (Internet Protocol) network from a client such as a personal computer to a data communication apparatus such as MFP, and transmission of data such as image data, have become in widespread use.

As one of the conventional methods of the data communication via the IP network as mentioned above, an art is heretofore known already (for example, Japanese Unexamined Laid-open Patent Publication No. 2005-159588): establishing a session by SIP (Session Initiation Protocol) that is a call control protocol, and transferring data by a data communication protocol other than the call control protocol after the session is established.

Another art is also heretofore known already (Japanese Unexamined Laid-open Patent Publication No. 2005-86580): controlling to permit/reject data reception according to preliminarily registered network addresses (an available network range) and IP addresses.

However, the former heretofore known art mentioned above is not designed so that a client, which established a session by SIP can perform data communication preferentially, thus, data may happen to be received also from other clients while and after the session is established by said client. In other words, data from a client, which already established a session, cannot be received efficiently.

Besides, the latter heretofore known art mentioned above is not specially designed either for session establishment or for data communication, thus the clients other than those whose IP addresses are preliminarily registered don't have a chance to transfer data at any time. Thus, it is so inconvenient that the art cannot be applied to a call control by SIP in its entirety.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

It is an object of the present invention to provide a data communication apparatus, which is able to establish a session by a call control protocol and receiving data efficiently from the client, which established a session to communicate data by a data communication protocol that is other than a call control protocol.

It is a further object of the present invention to provide a data communication method, wherein a session is established by a call control protocol and data can be received efficiently from the client, which established a session to communicate data by a data communication protocol that is other than a call control protocol.

It is yet a further object of the present invention is to provide a data communication processing program stored on a computer readable medium to make a computer for the data communication apparatus as mentioned above execute a data communication process.

A first aspect of the present invention is a data communication apparatus, comprising:
  a first control unit for controlling a client trying to access in order to establish a session by a call control protocol, for data communication by a data communication protocol that is other than said call control protocol;
  an IP address acquiring unit for acquiring an IP address of said client from the data of said call control protocol; and
  a second control unit for rejecting data communication from a client, which IP address is other than said acquired IP address, while and after said session is established.

A second aspect of the present invention is a data communication method comprising the steps of:
  controlling a client trying to access in order to establish a session by a call control protocol, for data communication by a data communication protocol that is other than said call control protocol;
  acquiring an IP address of said client from the data of said call control protocol; and
  rejecting data communication from a client, which IP address is other than said acquired IP address, while and after said session is established.

A third aspect of the present invention is a data communication processing program stored on a computer readable medium to make a computer execute the steps of:
  controlling a client trying to access in order to establish a session by a call control protocol, for data communication by a data communication protocol that is other than said call control protocol;
  acquiring an IP address of said client from the data of said call control protocol; and
  rejecting data communication from a client, which IP address is other than said acquired IP address, while and after said session is established.

Other objectives and features of the present invention will be explained in detail with reference to the following attached drawings.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6 is a view showing another example of an INVITE message of SIP; and

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
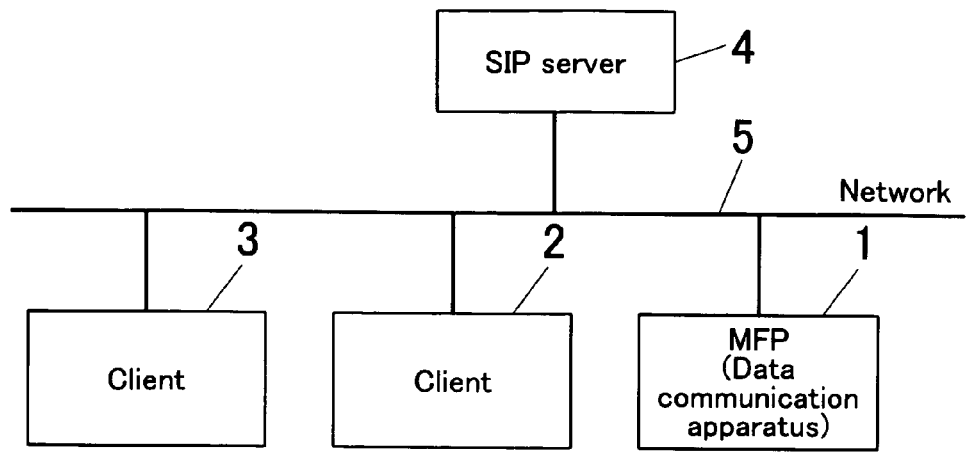
FIG. 1 is a block diagram showing a structure of a data communication system, wherein MFP is used as a data communication apparatus according to one embodiment of the present invention.

FIG. 1 is a block diagram showing a structure of a data communication system, wherein a data communication apparatus is employed according to one embodiment of the present invention.

As shown in FIG. 1, said data communication system comprises MFP 1 as a data communication apparatus, a plurality of (e.g., two) client 2 and 3 that perform data communication with MFP 1, and an SIP server 4. MFP 1, the client 2 and 3, and the SIP server 4 are connected via a network 5.

The client 2 and 3 comprise a data communication apparatus that is a terminal device such as a personal computer, however, they may comprise other data communication apparatus, such as MFP.

The SIP server 4 serves as an intermediate to establish a session by SIP and is frequently employed in the data communication system, however, the data communication system may be structured without said SIP server 4.

Figure 2:
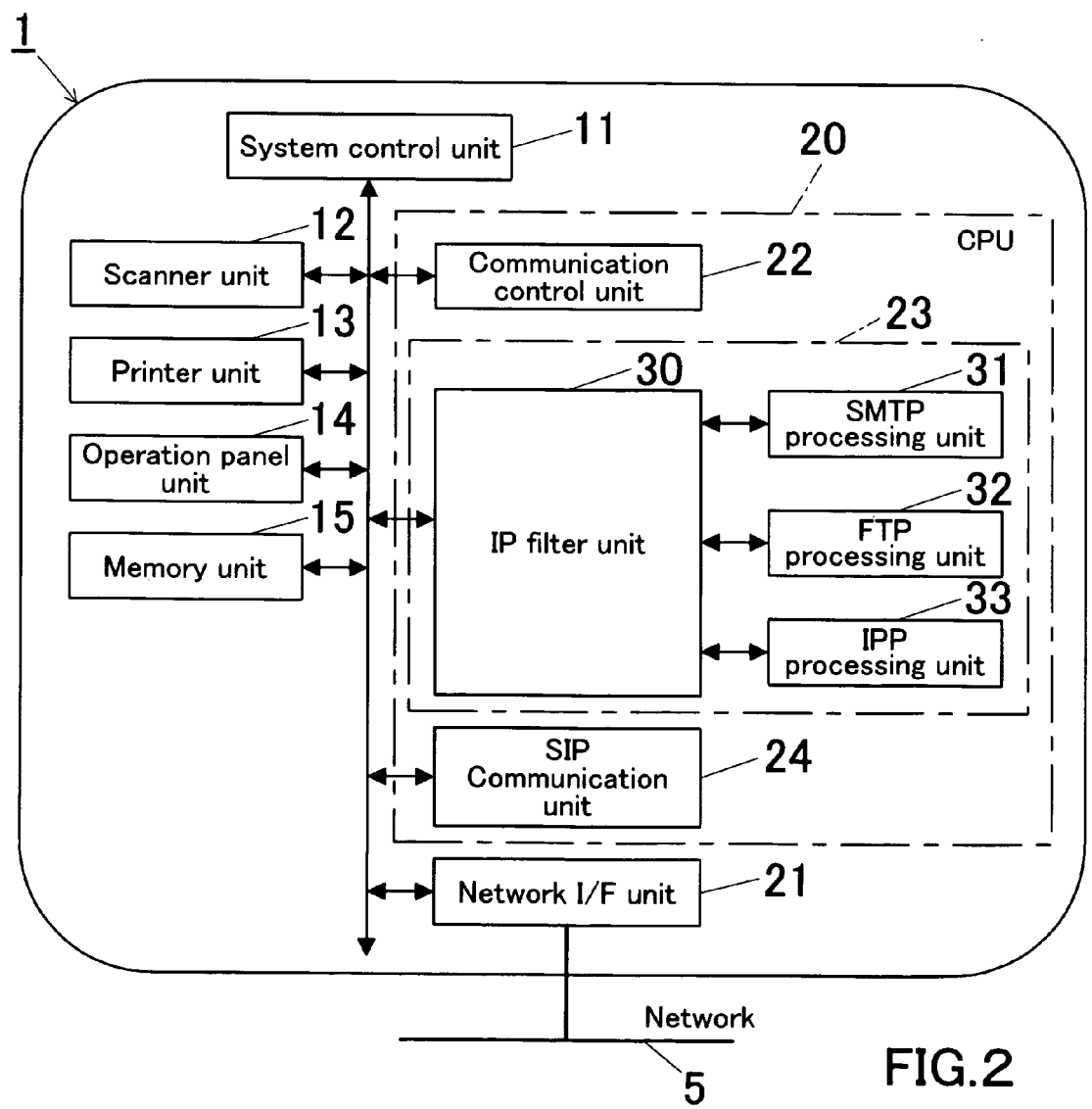
FIG. 2 is a block diagram showing an electrical composition of MFP.

Referring to FIG. 2, block diagram of an electrical composition of said MFP 1 will be described.

As shown in FIG. 2, MFP 1 comprises a system control unit 11, a scanner unit 12, a printer unit 13, an operation panel unit 14, a memory unit 15, a CPU 20, and a network interface (I/F) unit 21.

The system control unit 11 is for controlling entirety of the functions of MFP 1.

The scanner unit 12 is for generating electronic data (image data) by scanning images on a sheet.

The printer unit 13 is for printing electronic data from the scanner unit 12, or data transmitted via the network 5.

The operation panel unit 14 is for various operations and mode settings, and comprise a key operation unit and a liquid crystal display unit (even both are not shown in FIG. 1).

The memory unit 15 is for storing various data including a program to be executed by the CPU 20.

The CPU 20 comprises a communication control unit 22, a communication protocol processing unit 23 and an SIP communication unit 24, not physically but functionally.

The communication control unit 22 is for controlling entirety of the data communication functions according to an IP address of the client 2 (or 3) or a data communication protocol specified by the client 2 (or 3). And the communication control unit 22 functions as a second control unit for rejecting data communication from the client 2 (or 3) who tries to access and establish a session by SIP while or after the session is established.

More specifically, status of session by SIP from a SIP communication unit 24, information (an IP address and a protocol) from the client 2 (or 3) and status of communication from a communication protocol processing unit 23 are respectively notified to said communication control unit 22. According to the notified information, the communication control unit 22 then shall set an IP address of the client 2 (or 3) on the IP filter unit 30 of a communication protocol processing unit 23, to permit data communication from the set IP address as well as reject data communication from those other than the set IP address, and it shall also cancel the setting.

The communication protocol processing unit 23 not only executes a data communication process by a data communication protocol other than SIP, but also limits data communication from the client 2 (or 3) according to an instruction of the communication control unit 22. In the present embodiment, the communication protocol processing unit 23 comprises an SMTP (Simple Mail Transfer Protocol) processing unit 31, an FTP (File Transfer Protocol) processing unit 32 and an IPP (Internet Printing Protocol) processing unit 33 for data communication processing by each protocol, and an IP filter unit 30 for setting limitation of data communication from the client 2 (or 3) about each data communication protocol.

Further, the SMTP processing unit 31, the FTP processing unit 32 and the IPP processing unit 33, are able to notify their own communication status to the communication control unit 22.

The SIP communication unit 24 is for protocol processing to establish a session by SIR It functions as a first control unit for controlling a client, which tries to access and establish a session by SIP, in order to establish said session. In addition, the SIP communication unit 24 also has a function to acquire an IP address of the client and a data communication protocol specified by the client for data communication, and then transmit the acquired information to the communication control unit 22 together with the status of session by SIP.

The network I/F unit 21 has a function to acquire data from the network 5 or transmit data of MFP 1 to the network 5, via hardware.

Figure 3:
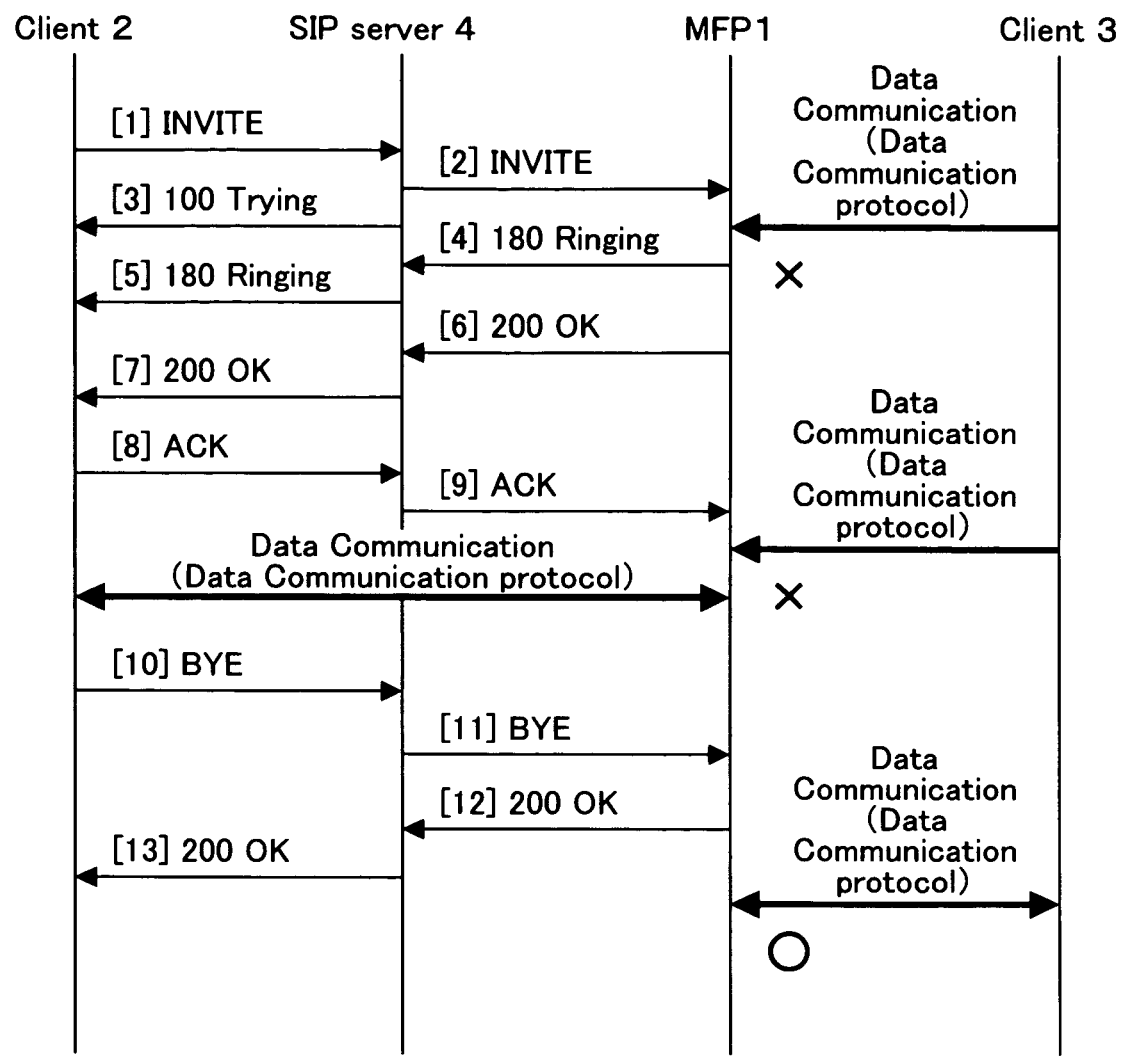
FIG. 3 is a view showing a communication sequence in the data communication system of FIG. 1.

Referring to FIG. 3, a communication sequence in the data communication system in FIG. 1 will be described.

As shown in FIG. 3, data communication from the client 3 is temporarily rejected due to the client 2 establishing a session with MFP 1 by SIR The client 2 adds protocol information to be used for data communication into an INVITE message of SIP and transmits the message to the SIP server 4 ([1] in FIG. 3), and then the SIP server 4 forwards the INVITE message to MFP 1 ([2]

in FIG. 3). Subsequentially, the SIP server 4 returns to the client 2, a Trying message indicating that the message is now being forwarded to MFP 1 ([3] in FIG. 3).

After the INVITE message is received by MFP 1, the SIP communication unit 24 acquires information of the IP address of the client 2 and the protocol for data communication, and the IP filter unit 30 of the communication protocol processing unit 23 sets the IP address of the client 2 according to an instruction of the communication control unit 22, in order to permit data communication by the acquired protocol from the client 2.

Furthermore, the MFP1 returns to the SIP server 4 a Ringing message indicating a session is now being prepared ([4] in FIG. 3), and the SIP server 4 forwards the message to the client 2 ([5] in FIG. 3).

From the point of time until the once established session by SIP is canceled, MFP 1 will reject data communication from the client 3, whose IP address is other than that of the client 2. However, in the embodiment where the data communication from the client 3 is rejected, the communication protocol of the client 3 is limited to the same of the client 2, and the data communication is not rejected if the data communication protocols are different. For example, if the client 2 tries to establish a session by SMTP, data communication only by SMTP is rejected while data communication by other protocols such as FTP and IPP is permitted. Thus, the method would solve such an inconvenience, that data communication by a certain data communication protocol from the client 2 is interrupted by data communication by the same protocol from the client 3.

Meanwhile, in FIG. 3, the client 3 is trying to perform data communication and the mark x indicates it is rejected.

Upon completion of preparations for data communication, MFP 1 returns an OK message to the SIP server 4 ([6] in FIG. 3) and the SIP server 4 forwards the OK message to the client 2 ([7] in FIG. 3).

Upon receiving this message, the client 2 transmits an ACK message to the SIP server 4 ([8] in FIG. 3) and the SIP server 4 forwards the ACK message to MFP 1 ([9] in FIG. 3). Thus, a session by SIP is successfully established.

Now the client 2 performs data communication directly with MFP 1 by the protocol specified in the INVITE message.

Upon completion of the data communication, the client 2 transmits a BYE message requesting cancellation of the session by SIP ([10] in FIG. 3) and the SIP server 4 forwards the BYE message to MFP 1 ([11] in FIG. 3). Then MFP 1 executes a process to cancel the session by SIP, and transmits an OK message after the process is completed ([12] in FIG. 3).

Meanwhile, the communication control unit 22 in MFP 1 executes a process to cancel the limitation of IP address that is set on the IP filter unit 30 of the communication protocol processing unit 23. Thus, free data communication is enabled without limitation of client. In FIG. 3, mark o indicates that data communication from the client 3 is now permitted.

As understood with reference to the sequence explained above, data can be received efficiently from the client 2 who tries to access and establish a session by SIP, without interruption by data communication from the client 3.

Besides, when the once established session by SIP, a call control protocol, is canceled, then the limitation of data communication from the client 3 is also canceled at the same time, data can be received from any client. Thus, this method would not cause such an inconvenience that limitation of data communication from the client 3 is continued longer than necessary.

In the following, a communication process executed by said MFP 1 will be explained with reference to a flowchart shown in FIG. 4. The process is executed by CPU 20 according to a program recorded in the memory 15.

Figure 4:
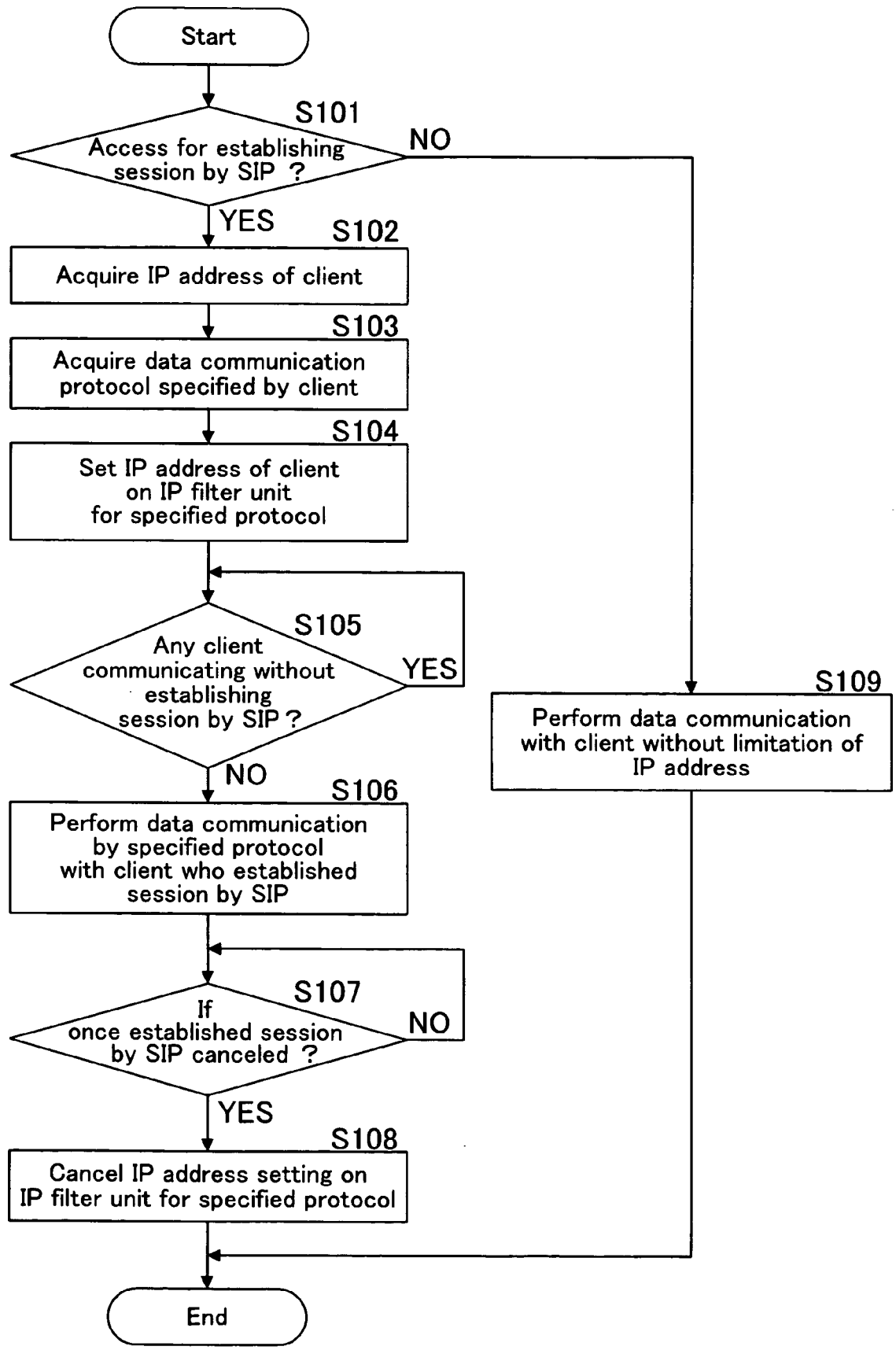
FIG. 4 is a flowchart showing a communication process in MFP.

First, in Step S101 of FIG. 4, CPU 20 determines whether or not the client 2 already started access for establishing a session by SIR More particularly, it is determined whether or not an INVITE message of SIP is transmitted from the client 2.

If the client 2 not yet started access for establishing a session by SIP (NO in Step S101), then in step S109, CPU 20 performs data communication with all the clients 2 and 3 without limitation of IP address.

If the client 2 already started access for establishing a session by SIP (YES in Step S101), then in Step S102, an IP address of the client 2 is acquired from said INVITE message, and then in Step 103, a data communication protocol specified by the client 2 is acquired.

Subsequently in Step S104, in order to permit data communication by said acquired protocol only from the client 2, the IP address of the client 2 is set on the IP filter unit 30 about said acquired protocol.

In Step S105, it is determined whether or not there exists the client 3 who is performing data communication without establishing a session by SIP, and if there does not exist (NO in Step S105), the process proceeds to Step S106. If there does exist, (YES in step S105), the process waits in Step S105 until the data communication is completed, and if the communication is completed, then the process proceeds to Step S106.

When the process waits in Step S105, MFP 1 shall transmit a Ringing message, not an OK message as shown in FIG. 3, to the client 2 who is trying to establish a session, to notify MFP 1 is waiting for completion of data communication from the client 3.

In Step S106, MFP 1 receives data by a specified protocol from the client 2 who established a session by SIP, and then the received data is processed through the SMTP processing unit 31, the FTP processing unit 32 and the IPP processing unit 33 that are located inside of the communication protocol processing unit 23. Meanwhile, data reception from those other than the set IP address on the IP filter unit 30 is rejected. At the same time, a warning message, saying that data communication by the specified protocol with other clients is not permitted, may be displayed on the operation panel unit 14 of MFP 1, In Step S107, it is determined whether or not the session that the client 2 established by SIP is already canceled. If the session is not yet canceled (NO in Step S107), then the process waits in Step S107 until it is canceled. If the session is already canceled (YES in Step S107), the process proceeds to Step S108, in which the IP address set on the IP filter 30 about the specified protocol is canceled. And then the process terminates.

Hence, the MFP 1 returns to the state in which data communication is enabled with all the clients 2 and 3. Besides, a particular address for example '255.255.255.255' or flags may be set on the IP filter unit 30 in order to enable data communication with all the clients 2 and 3.

In addition, FIG. 4 shows a configuration in which data communication from those other than the client 2 that established a session by SIP is rejected. However, the configuration may be also designed so that data reception by a protocol specified in an INVITE message from all clients even including the client 2 who established a session by SIP, is rejected.

The configuration as introduced right above is useful for a case in which data communication by one protocol is increased and this causes an interference with data communication by other protocols, because the data communication by the former protocol can be temporarily suspended.

More in particular, in order to reject data reception by the protocol specified in an INVITE message from all clients including the client 2, the address such as '0.0.0.0' should be set on the IP filter unit 30 for negation of every IP address about the specified protocol in the protocol processing by the communication protocol processing unit 30. Besides, flags may be set to accomplish the same goal.

Figure 5:
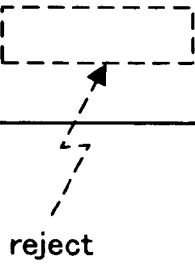
FIG. 5 is a view showing one example of an INVITE message of SIP.

FIG. 5 shows an example of an INVITE message, one of the SIP messages.

The example of an INVITE message sown in FIG. 5 is originated at URL of [Client2@Sapporo.com] and transmitted from a client, which IP address of [192.168.25.51], to MPF 1, a destination at URL of [device@konicaminolta.jp].

Regarding the INVITE message, an IP address of the client is provided in [o=−1 1 IN IP4 192.168.25.51] and [c=IN IP4 192.168.25.51], and a protocol for data communication is specified in [m=data 10001 tcp ftp]. Here, FTP is specified for data communication.

According to the embodiment, if MFP 1 receives the SIP message shown in FIG. 5, the IP address [192.168.25.51] is set on the IP filter unit 30 to reject data communication by FTP from those other than said set IP address.

As previously mentioned, in order to reject data communication by one protocol specified in an INVITE message from all clients including the client 2 who established a session by SIP, [reject] should be added right after [m=data 10001 tcp ftp] in the INVITE message shown in FIG. 5, to define that data communication from all clients including the client 2 is rejected.

In the examples introduced above, the client 2 trying to establish a session by SIP is the only one client from which data communication by the specified data communication protocol is permitted. However, the configuration may be designed so that the client 2 that established a session by SIP can perform data communication by a specified data protocol from the client 3 as well as the client 2 itself. In the case, the MFP 1 can perform data communication from plurality of clients simply by the client 2's session establishment by SIP.

FIG. 6 shows an example of an INVITE message from the client 2 trying to establish a session by SIP in order to permit data communication from the client 3 as well as the client 2 itself.

In FIG. 6, a difference with that shown in FIG. 5 is the part of [c=IN IP4 IP4 192.168.25.51 IN IP4 192.168.2.121].

In the example, the INVITE message is to request MFP 1 to permit data communication from the client 3, whose IP address is [192.168.2.121], as well as data communication from the client 2, who tries to establish a session by SIP and whose IP address is [192.168.25.51].

Upon receiving the request, MFP 1 sets the both IP addresses on the IP filter unit 30 about the specified data communication protocol.

Meanwhile, data communication from three or more clients may be permitted due to the client 2 establishing a session by SIP, not limited to the only two clients.

In the following, a communication control process executed in the communication protocol processing unit 23 about each data communication protocol will be explained with reference to the flowchart in FIG. 7. The process is also executed by CPU 20 according to a program recorded in the memory unit 15.

Figure 7:
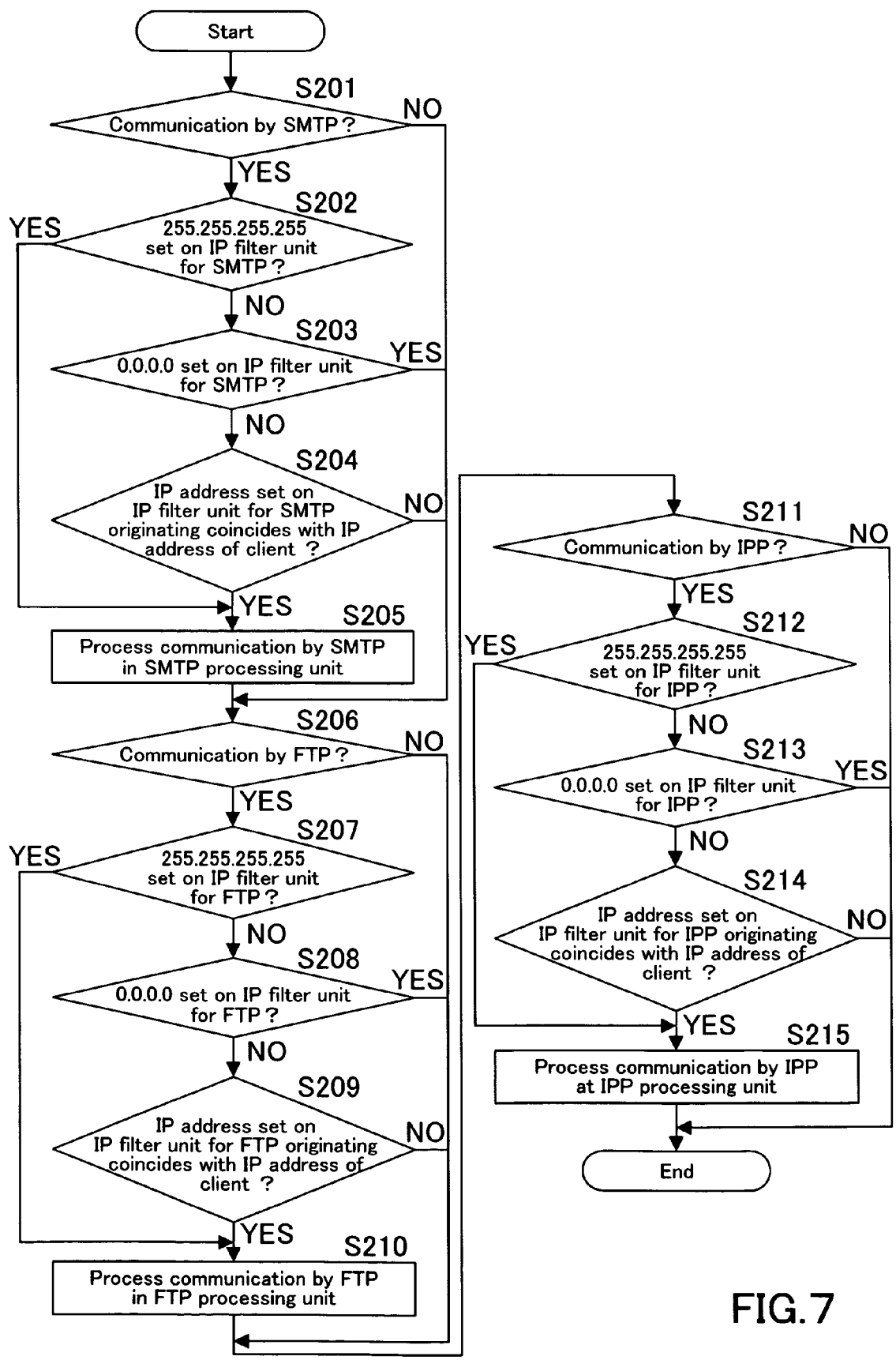
FIG. 7 is a flowchart showing a communication control process executed in a communication protocol processing unit, for respective protocols.

In Step S201 of FIG. 7, it is determined whether of not the communication is performed by SMTP. If the communication is not performed by SMTP (NO in Step S201), the process proceeds to Step S206. If the communication is performed by SMTP (YES in step S201), the process proceeds to Step S202.

In Step S202, it is determined whether or not '255.255.255.255' (affirmation of every IP address, without limitation) is set on the IP filter unit 30 about SMTP. If '255.255.255.255' is set on the IP filter unit 30 about SMTP (YES in step S202), then the process proceeds through Step S205 where the communication is processed by SMTP in the SMTP processing unit 31, and then to Step S206. If '255.255.255.255' is not set on the IP filter unit 30 about SMTP (NO in step S202), the process proceeds to Step S203.

In Step S203, it is determined whether or not '0.0.0.0' (negation of every IP address) is set on the IP filter unit 30 about SMTP. If '0.0.0.0' is set on the IP filter unit 30 about SMTP (YES in step S203), the process proceeds to Step S206. If '0.0.0.0' is not set on the IP filter unit 30 about SMTP (NO in step S203), the process proceeds to Step S204.

In Step S204, it is determined whether or not the IP address set on the IP filter unit 30 about SMTP coincides with that of the originator, the client 2. If the IP address set on the IP filter unit 30 does not coincide with that of the client 2 (NO in step S204), the process proceeds to Step S206. If the IP address set on the IP filter unit 30 coincides with that of the client 2 (YES in Step S204), then the process proceeds through Step S205 where the communication is processed by SMTP in the SMTP processing unit 31, and then to Step S206.

In Step S206, it is determined whether or not the communication is performed by FTR. If the communication is not performed by FTP (NO in step S206), the process proceeds to step S211. If the communication is performed by FTP (YES in step S206), the process proceeds to step S207.

In Step S207, it is determined whether or not '255.255.255.255' (affirmation of every IP address) is set on the IP filter unit 30 about FTR. If '255.255.255.255' is set on the IP filter unit 30 about FTP (YES in step S207), then the process proceeds through Step S210 where the communication is processed by FTP in the FTP processing unit 32, and then to Step S211. If '255.255.255.255' is not set on the IP filter unit 30 about FTP (NO in step S207), the process proceeds to Step S208.

In Step S208, it is determined whether or not '0.0.0.0' (negation of every IP address) is set on the IP filter unit 30 about FTP. If '0.0.0.0' is set on the IP filter unit 30 about FTP (YES in step S208), the process proceeds to Step S211. If '0.0.0.0' is not set on the IP filter unit 30 about FTP (NO in step S208), the process proceeds to Step S209.

In Step S209, it is determined whether or not the IP address set on the IP filter unit 30 about FTP coincides with that of the originator, the client 2. If the IP address set on the IP filter unit 30 does not coincide with that of the client 2 (NO in step S209), the process proceeds to step S211. If the IP address set on the IP filter unit 30 coincides with that of the client 2 (YES in step S209), the process proceeds through Step S210 where the communication is processed by FTP in the FTP processing unit 32, and then to Step S211.

In Step S211, it is determined whether or not the communication is performed by IPP. If the communication is not performed by IPP (NO in step S211), the process is directly terminated. If the communication is performed by IPP (YES in step S211), the process proceeds to step S212.

In Step S212, it is determined whether or not '255.255.255.255' (affirmation of every IP address) is set on the IP filter unit 30 about IPP. If '255.255.255.255' is set on the IP filter unit 30 about IPP (YES in step S202), then in step S215 the communication is processed by IPP in the IPP processing unit 33, and then the process is directly terminated. If '255.255.255.255' is not set on the IP filter unit 30 about IPP (NO in step S212), the process proceeds to Step S213.

In Step S213, it is determined whether or not '0.0.0.0' (negation of every IP address) is set on the IP filter unit 30 about IPP. If '0.0.0.0' is set on the IP filter unit 30 about IPP (YES in Step S213), the process is directly terminated. If '0.0.0.0' is not set on the IP filter unit 30 about IPP (NO in Step S213), the process proceeds to Step S214.

In Step S214, it is determined whether or not the IP address set on the IP filter unit 30 about IPP coincides with that of the originator, the client 2. If the IP address set on the IP filter unit 30 does not coincide with that of the client 2 (NO in step S214), the process is directly terminated. If the IP address set on the IP filter unit 30 coincides with that of the client 2 (YES in step S214), then in Step S215 the communication is processed by IPP in the IPP processing unit 33, and then the process is directly terminated.

According to the embodiment as explained above, the configuration is designed so that data communication from other clients can be rejected by specifying a data communication protocol. Thus, even if the client 2 established a session by SIP in which FTP is specified for example, to reject data communication from the client 3, the MFP 1 can perform data communication by other protocols, such as SMTP, with all clients including the client 3 as well as the client 2. However, for the sake of simplification, the configuration may be also designed so that data communication by all data communication protocols can be permitted for specified clients including the client 2 itself, without specifying a data communication protocol. In addition, in a case where an IP address of transfer destination is acquired by establishing a session and data transmission to the acquired IP address is performed by SMTP, image data from other apparatus to the IP address is not received while the call control by SIP is performed. Thus, a transmission error with IP facsimile data sent to the IP address by SMTP can be prevented.

In addition, SIP is used as a call control protocol in the present embodiment described above, however, the call control protocol is not necessarily limited to SIP. For example, "H. 323" to which a call control protocol used for a public telephone network is applied for an IP network, and other call control protocols may be used.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A data communication apparatus, comprising:
a first control unit for receiving an initial request message from a first client to establish a first session by a call control protocol, for data communication from the first client by a data communication protocol that is other than said call control protocol; an IP address acquiring unit for acquiring an IP address of said first client from the initial request message; and a second control unit for rejecting additional data communication from a second client, having an IP address other than said acquired IP address, on the condition that the additional data communication from the second client uses the same data communication protocol used by the first client, during the time period from when the initial request message is received until the conclusion of the first session, whereby additional data communication from the second client that uses a different data communication control protocol than the first client is not rejected during said time period.

2. The data communication apparatus as recited in claim 1, wherein said second control unit cancels the rejection of additional data communication from the second client, after the first session by said call control protocol is canceled.

3. The data communication apparatus as recited in claim 1, wherein the second control unit permits additional data communication by any data communication protocol other than the data communication protocol that is to be used by the first client, when the second client tries to establish a second session by a call control protocol as a result of said first session trying to be established and being pending.

4. The data communication apparatus as recited in claim 3, wherein said second control unit rejects additional data communication by the data communication protocol that is to be used by the first client, when any client, including the first client, tries to establish a second session by a call control protocol.

5. The data communication apparatus as recited in claim 3, wherein information about the data communication protocol that is to be used by the first client, which tries to establish the first session by a call control protocol, is acquired from the data of said call control protocol.

6. The data communication apparatus as recited in claim 1, wherein said IP address acquiring unit acquires IP addresses of a plurality of clients from the data of said call control protocol, and said second control unit permits data communication from said acquired IP addresses of a plurality of clients.

7. A data communication method comprising the steps of:
receiving an initial request message from a first client to establish a first session by a call control protocol, for data communication from the first client by a data communication protocol that is other than said call control protocol; acquiring an IP address of said first client from the initial request message; rejecting, additional data communication from a second client, having an IP address other than said acquired IP address, on the condition that the additional data communication from the second client uses to the same data communication protocol used by the first client, during the time period from when the initial request message is received until the conclusion of the first session, whereby additional data communication from the second client that uses a different data communication control protocol than the first client is not rejected during said time period.

8. The data communication method as recited in claim 7, wherein the rejection of additional data communication from the second client is canceled after the first session by said call control protocol is canceled.

9. The data communication method as recited in claim 7, further comprising permitting additional data communication by any data communication protocol other than the data communication protocol that is to be used by the first client, when the second client tries to establish a second session by a call control protocol, as a result of said first session trying to be established and being pending.

10. The data communication method as recited in claim 9, wherein additional data communication by the data communication protocol that is to be used by the first client, when any client including the first client tries to establish a second session by a call control protocol, is rejected while said first session is trying to be established and is pending.

11. The data communication method as recited in claim 9, wherein information about the data communication protocol that is to be used by the first client, which tries to establish the first session by a call control protocol is acquired from the data of said call control protocol data.

12. The data communication method as recited in claim 7, comprising the steps of:
acquiring, from data of said call control protocol, each of IP addresses of a plurality of clients; and
permitting, during establishing and after establishment of said first session, data communication for a plurality of clients whose IP address is acquired.

13. A non-transitory computer readable medium storing a data communication processing program causing a computer to execute the steps of: receiving an initial request message from a first client to establish a first session by a call control protocol, for data communication from the first client by a data communication protocol that is other than said call control protocol; acquiring an IP address of said first client from the initial request message; and rejecting, additional data communication from a second client, having an IP address other than said acquired IP address, on the condition that the additional data communication from the second client uses the same data communication protocol used by the first client, during the time period from when the initial request message is received until the conclusion of the first session, whereby additional data communication from the second client that uses a different data communication control protocol than the first client is not rejected during said time period.

14. The non-transitory computer readable medium as recited in claim 13, wherein the data communication processing program further causes a computer execute a step for cancelling the rejection of additional data communication from the second client, after the first session by said call control protocol is canceled.

15. The non-transitory computer readable medium as recited in claim 13, wherein the data communication processing program further causes a computer execute a step for permitting additional data communication by any data communication protocol other than the data communication protocol that is to be used by the first client, when the second client tries to establish a second session by a call control protocol, as a result of said first session trying to be established and being pending.

16. The non-transitory computer readable medium as recited in claim 15, wherein the data communication processing program further causes a computer execute a step for rejecting additional data communication by the data communication protocol that is to be used by the first client, when any client, including the first client, tries to establish a second session by a call control protocol.

17. The non-transitory computer readable medium as recited in claim 15, wherein the data communication processing program further causes a computer execute a step for acquiring information of the data communication protocol that is to be used by the first client, which tries to establish the first session by a call control protocol, from the data of said call control protocol.

18. The non-transitory computer readable medium as recited in claim 13, wherein the data communication processing program further causes a computer execute a step for acquiring IP addresses of a plurality of clients from the data of said call control protocol, and permitting data communication from the acquired IP addresses of a plurality of clients while said first session is trying to be established and is pending.

19. The data communication apparatus as recited in claim 1, wherein:
the first session is established between the data communication apparatus and the first client such that the second control unit of the data communication apparatus rejects the additional data communication from the second client, different from the first client, based on the established first session with the first client.

20. The data communication apparatus as recited in claim 1, wherein the data communication apparatus determines whether a specified message has been received, as a determination result, such that the data communication apparatus selectively operates between: (1) a first mode in which the data communication apparatus rejects the additional data communication from the second client; and (2) a second mode in which the data communication apparatus does not reject the additional data communication from the second client based on the determination result.

* * * * *